United States Patent
Nakagawa et al.

(10) Patent No.: US 6,713,972 B2
(45) Date of Patent: Mar. 30, 2004

(54) ULTRA-HIGH PRESSURE DISCHARGE LAMP LIGHTING METHOD, ULTRA-HIGH PRESSURE DISCHARGE LAMP TO WHICH THE METHOD IS APPLICABLE AND BALLAST FOR USE THEREIN, AND LIGHTING SYSTEM INCORPORATING THE LAMP AND THE BALLAST

(75) Inventors: Atsuji Nakagawa, Himeji (JP); Toshitaka Hujii, Himeji (JP); Hisao Hurukawa, Himeji (JP); Tomihiko Ikeda, Himeji (JP); Tetsuya Shirai, Himeji (JP)

(73) Assignee: Phoenix Electric Co., Ltd., Himeji (JP)

( * ) Notice: Subject to any disclaimer, the term of this patent is extended or adjusted under 35 U.S.C. 154(b) by 161 days.

(21) Appl. No.: 09/906,713

(22) Filed: Jul. 18, 2001

(65) Prior Publication Data

US 2002/0105288 A1 Aug. 8, 2002

(30) Foreign Application Priority Data

Dec. 8, 2000 (JP) .......................................... 2000-375018

(51) Int. Cl.⁷ .............................. G05F 1/00; H01J 61/22
(52) U.S. Cl. ....................................... 315/291; 313/639
(58) Field of Search ................................ 315/291, 307, 315/224, 246; 313/633, 634, 639, 636, 640, 628, 632, 641

(56) References Cited

U.S. PATENT DOCUMENTS

| | | | | |
|---|---|---|---|---|
| 4,143,301 A | * | 3/1979 | Strauss et al. ................. | 315/73 |
| 5,072,155 A | * | 12/1991 | Sakurai et al. ............... | 315/219 |
| 5,109,181 A | | 4/1992 | Fischer et al. | |
| 5,471,278 A | * | 11/1995 | Yasuda et al. ................. | 355/67 |
| 5,541,481 A | * | 7/1996 | Yamaguchi et al. ......... | 313/638 |
| 5,905,341 A | * | 5/1999 | Ikeuchi et al. ............... | 313/639 |
| 5,949,192 A | * | 9/1999 | Kominami et al. ........... | 315/94 |
| 6,545,430 B2 | * | 4/2003 | Ono et al. ................... | 315/291 |

* cited by examiner

*Primary Examiner*—Haissa Philogene
*Assistant Examiner*—Chuc Tran
(74) *Attorney, Agent, or Firm*—Oblon, Spivak, McClelland, Maier & Neustadt, P.C.

(57) ABSTRACT

There is provided a novel method of lighting an ultra-high pressure discharge lamp (A1) having a discharge bulb (1) made of quartz glass in which a pair of electrodes (2) and (3) are disposed facing each other, the method including: lighting the lamp with alternating current; and providing a time period of at least one second for which the alternating current assumes a lighting frequency of 5 Hz or lower during a period for which the lamp lights, wherein the electrodes (2) and (3) each have a current withstanding capability against a current 1.5 times or more as high as a current value at which the lamp lights stably. This method enables the ultra-high pressure discharge lamp to have a longer life and exhibit a higher luminance.

16 Claims, 2 Drawing Sheets

ULTRA-HIGH PRESSURE DISCHARGE LAMP LIGHTING METHOD, ULTRA-HIGH PRESSURE DISCHARGE LAMP TO WHICH THE METHOD IS APPLICABLE AND BALLAST FOR USE THEREIN, AND LIGHTING SYSTEM INCORPORATING THE LAMP AND THE BALLAST

BACKGROUND OF THE INVENTION

1. Field of the Invention

The present invention generally relates to ultra-high pressure discharge lamps and, more particularly, to novel methods of lighting such ultra-high pressure discharge lamps, ultra-high pressure discharge lamps to which the methods of the invention are applicable, and ballasts for use in such ultra-high pressure discharge lamps.

2. Description of the Related Art

In these years, a liquid crystal projector market has grown rapidly, and a market for consumer-oriented data projectors and rear projection television sets adapted for digital broadcasting is expected to grow explosively in near future. In meeting the demand of such a growing market, the life of a light source and countermeasures against flicker are critical factors.

Heretofore, brightness has been the only one standard for estimating the performance of such a light source and, hence, there has been a keen competition for a higher brightness. Ultra-high pressure discharge lamps developed as a result of such a keen competition generally exhibit a high luminance attained by shortening the arc length to the limit and increasing the pressure of mercury in the discharge bulb to 150 atm or higher so as to raise the arc temperature.

Though the luminance of such a conventional ultra-high pressure discharge lamp has been improved in the manner described above, tradeoffs have occurred such that an electrode surface adjacent the location at which an arc is generated is consumed too rapidly and that flicker due to such rapid consumption of the electrodes is likely to occur. At present, these tradeoffs cannot be controlled. Conventional ultra-high pressure discharge lamps cause steady flicker to occur after 400 hours' use (refer to Table 1), and the illuminance of a screen illuminated by a projector incorporating such a conventional ultra-high pressure discharge lamp lowers by about 50% after 1,000 hours' use of the lamp. Thus, conventional ultra-high pressure discharge lamps also have a problem in keeping the screen illuminance.

Though there has been developed an ultra-high pressure discharge lamp assuring a certain illuminance kept for 1,000 hours or longer, an electrode surface adjacent the arc generating location in such a lamp becomes roughened and, hence, the discharge initiating point frequently moves about, which is observed as flicker on the screen. It is, therefore, needless to say that light sources to be incorporated in consumer-oriented products have to be flickerless while keeping a satisfactory screen illuminance for a longer time.

An invention related to an ultra-high pressure discharge lamp is disclosed in Japanese Patent Gazette No. 2,829,339. The Gazette mentions use of a typical halogen cycle for preventing blackening due to evaporation of tungsten and describes that if the amount of a halogen used is large, the electrodes are consumed heavily and, hence, the life of the lamp becomes as short as several hundreds of hours. The invention of this Gazette consists in reducing the amount of the halogen to the limit in order to prevent such a rapid consumption of electrodes due to the halogen. However, such an extremely reduced amount of the halogen is critical and hence may fail to ensure a desired halogen cycle. As a result, the discharge bulb is sometimes blackened due to evaporation of tungsten.

The Patent Gazette teaches the fact that the life of 5,000 hours or longer was attained by reducing the amount of the halogen to the limit. Even an ultra-high pressure discharge lamp that escaped being blackened at its discharge bulb, however, was observed to have its electrodes consumed or roughened at their surfaces adjacent the arc generating location. In an extreme case plural projections were formed on the electrodes. Due to such roughness at the surfaces of the electrodes, the discharge initiating point frequently moved about on the electrode surface roughened and such a movement was reflected as flicker on a screen. Thus, the light source according to the Patent Gazette was not a practically acceptable one as a light source having a service life rated at 5,000 hours which assures a service life of 5,000 hours presently demanded.

As described above, the Patent Gazette mentions the amount of a halogen as the cause of the occurrence of electrode consumption. Specifically, the Patent Gazette concludes that encapsulation of a halogen in an amount of $1 \times 10^{-4}$ $\mu$mol/mm$^3$ or more is the only factor dominating the electrode consumption. In the experiment conducted by the inventors of the present invention, however, it was observed that an ultra-high pressure discharge lamp encapsulating a halogen in an amount less than $1 \times 10^{-4}$ $\mu$mol/mm$^3$ was blackened due to an incomplete halogen cycle while at the same time an electrode surface adjacent the arc generating location was deformed (roughened or formed with projections) after lapse of a few hundreds of hours from the starting of the experiment, that the discharge initiating point began moving about after lapse of 500 hours, and that flicker appeared on a screen after lapse of 1,000 hours. From this experiment it is deduced that other factors than the amount of a halogen which dominate the consumption of electrodes and the roughening of an electrode surface exist.

Japanese Patent Gazette No. 2,980,882 discloses an invention that intends to prevent blackening or blurring of a discharge bulb and consumption of electrodes by encapsulating an increased amount of a halogen as large as $2 \times 10^{-4}$ to $7 \times 10^{-3}$ $\mu$mol/mm$^3$ in order to absorb and reduce short wavelength ultraviolet ray. According to this Gazette, the mechanism of the occurrences of such inconveniences is that short wavelength ultraviolet ray generated during lighting of the lamp cuts off the silicon (Si)-oxygen (O) bond of quartz glass forming the discharge bulb of the lamp thereby to cause SiO to evaporate and such evaporated SiO in turn causes blurring of the discharge bulb and consumption of the electrodes. Stated otherwise, the Patent Gazette concludes that short wavelength ultraviolet ray is the factor dominating the blackening or blurring of a discharge bulb and consumption of electrodes.

The inventors of the present invention actually constructed an ultra-high pressure discharge lamp according to the scope claimed by the latter Patent Gazette and verified the effect of this lamp. As a result, it was found that consumption of the electrodes proceeded unusually rapidly and this fact was far worse than stated in the Gazette. More specifically, it was observed in the ultra-high pressure discharge lamp in which a large quantity of a halogen was encapsulated in order to inhibit the generation of short wavelength ultraviolet ray that the electrodes were consumed or roughened at their surfaces adjacent the arc generating location after lapse of 100 hours from the starting of the experiment, while at the same time the discharge initiating point moved around frequently, and that flicker appeared on a screen after lapse of 400 hours from the starting of the experiment. It is concluded from these results that the life of the ultra-high pressure discharge lamp according to the Patent Gazette in question cannot reach even 2,000 hours, which is the shortest life presently required of projector light sources and that it is absolutely impossible for the lamp to have a life of 10,000 hours, which is required of applications in television. This experiment also proved that the life of an ultra-high pressure discharge lamp could not be prolonged by absorbing and reducing short wavelength ultraviolet ray with an increased amount of an encapsulated halogen.

In view of the foregoing, the inventors of the present invention conducted experiments on the assumption that factors dominating the consumption or roughening of electrodes and formation of projections on the electrodes in an ultra-high pressure discharge lamp operated with alternating or direct current include a thermal factor, an oxygen factor and a silicon factor. As a result, it was discovered that the primary factor is oxygen remaining in the discharge bulb and the secondary factor is the thermal factor.

In the experiment elucidating the thermal factor, it was checked whether or not an improvement was made by increasing the thermal capacity of each electrode (refer to Table 1). According to the results of the experiment, an electrode having a higher thermal capacity was less consumed and the arc length was inhibited to lengthen. This can be confirmed from data of variations in arc length relative to a lighting time parameter. It was, however, found that no improvement was made as to roughening of an electrode surface adjacent the arc generating location. Thus, it is impossible to make the discharge initiating point stationary at one point. Incidentally, roughening of an electrode surface was observed by transmission of X-rays.

The experiment elucidating the oxygen factor and the silicon factor began with analysis of the state of electrodes in a finished lamp by means of EDX (Energy Dispersive X-ray spectroscopy). The EDX analysis proved that silicon is not a dominant factor. Since oxygen in a great quantity was detected on the surfaces of tungsten electrodes and the presence of tungsten oxides such as WO and $WO_2$ and mercury oxide was observed, oxygen is considered to be a dominant factor. According to the investigation made as to when oxygen was brought into the lamp and left therein, it was found that oxygen was brought into the lamp in the second sealing process, which is the final sealing process.

In conclusion, however, it is impossible to prevent production of SiO, which is responsible for the production of oxygen in the second sealing process, so long as the lamp envelope is made of quartz and, hence, it is impossible to provide a flickerless and long-life light source exhibiting a high luminance.

The present invention intends to solve this very difficult problem by utilizing the results of the experiments conducted to elucidate the factors dominating the life of an ultra-high pressure discharge lamp and the occurrence of roughening at surfaces of the electrodes of the lamp. Accordingly, it is an object of the present invention to provide a method of lighting an ultra-high pressure discharge lamp, which enables the lamp to have a longer life and exhibit a higher luminance. Another object of the present invention is to provide an ultra-high pressure discharge lamp to which the method of the invention is applicable. Still another object of the present invention is to provide a ballast for use in such a lamp, and a lighting system incorporating the lamp and the ballast.

SUMMARY OF THE INVENTION

According to the present invention, there is provided a method of lighting an ultra-high pressure discharge lamp having a discharge bulb made of quartz glass in which a pair of electrodes are disposed facing each other, the method comprising:

lighting the lamp with alternating current; and providing a time period of at least one second for which the alternating current assumes a lighting frequency of 5 Hz or lower during a period for which the lamp lights, wherein the electrodes each have a current withstanding capability against a current 1.5 times or more as high as a current value at which the lamp lights stably.

According to the present invention, there is also provided a method of lighting an ultra-high pressure discharge lamp having a discharge bulb made of quartz glass in which a pair of electrodes are disposed facing each other, the method comprising:

lighting the lamp with direct current; and performing a control such that a time period of at least one second for which the direct current is applied in a direction opposite to a direction of the current applied in usual lighting is intermittently provided during a period for which the lamp lights, wherein a negative electrode of the pair of electrodes has a current withstanding capability against a current 1.2 times or more as high as a current value at which the lamp lights stably.

From the results of experiments (to be described later) conducted by the inventors of the present invention, it seems that roughening of an electrode surface occurs due to an intricate correlation between a synergistic effect of the thermal factor and the oxygen factor and the mass of each electrode used. In the case where the mass of the electrode is small relative to the lighting current value, impingement of thermal electrons upon the electrode causes the temperature at an electrode surface adjacent the arc generating location to rise unusually and the highest temperature portion of the electrode surface is deformed or consumed by fusion with growing projections formed around the deformed portion. This is the thermal factor.

The oxygen factor is given rise to as follows. Oxygen in the discharge bulb resulting from decomposition of SiO produced in the final (second) sealing process reacts with tungsten forming the electrodes to produce tungsten oxide on surfaces of the electrodes. Further, tungsten oxide thus produced reacts with a halogen to produce a halogenated tungsten oxide, which in turn is decomposed by arc, resulting in tungsten partially deposited and accumulated on an end portion of each electrode. The tungsten thus deposited and accumulated on the electrodes gradually forms plural projections. Since thermal electrons have a disposition to be emitted from the tip of each projection, the discharge initiating point frequently changes due to the roughened electrode surfaces or the presence of plural projections, thus resulting in flicker. Stated otherwise, the occurrence of flicker is more dependent upon the surface state of the negative electrode from which thermal electrons are emitted than that of the positive electrode upon which thermal electrons impinge.

Since the lamp envelope is made of quartz as described above, oxygen is inevitably produced and, hence, roughening of an electrode surface due to the oxygen factor cannot but be considered to be inevitable. Thus, the present invention has overcome the problem by combining use of electrodes having an increased thermal capacity (i.e., an increased mass) and an improvement in applying electric current to the lamp. Specifically, in the case of lighting with alternating current, the lighting frequency of the current is established so that a time period of at least one second for which the alternating current assumes a lighting frequency of 5 Hz or lower is provided during a period for which the lamp lights. By so doing, thermal electrons are allowed to flow from one electrode to the other continuously for more than 1/5 second, which is longer than the alternating period of the current for usual lighting, whereby the surface of the thermal electron receiving electrode is heated and slightly fused. It should be noted that since the usual lighting frequency for an ultra-high pressure discharge lamp is 50 Hz or higher, the alternating period of the current in usual lighting is 1/50 second or shorter. If the surface of the thermal electron receiving electrode is roughened or formed with projections, the roughened surface or projections are fused and thinly extended over the electrode due to surface tension, whereby the roughening or projections are eliminated and, hence, the original spherical electrode surface is restored. Stated otherwise, if the lamp lights at a lighting frequency of 5 Hz or higher, the direction of the current applied changes before the roughening or projections on the electrode surface have been eliminated. As a result, the electrode surface becomes more roughened or the projections grow larger with time.

However, if the mass of each electrode is too small, the temperature of the electrode becomes too high due to continuous application of the current and, hence, the electrode is consumed. In view of this, the present invention has a feature that the electrodes each have a current withstanding capability against a current 1.5 times or more as high as a current value at which the lamp lights stably, whereby the electrodes can be prevented from being consumed due to continuous application of the current and allowed to restore their surfaces. Thus, the ultra-high pressure discharge lamp for lighting with alternating current can be made flickerless and to have a longer life.

In the case of lighting with direct current, a control is performed such that a time period of at least one second for which the direct current is applied in a direction opposite to a direction of the current applied in usual lighting is intermittently provided during a period for which the lamp lights. By doing so, thermal electrons are temporarily emitted from the positive electrode to the negative electrode to restore the negative electrode by heating. In the case of lighting with direct current, the negative electrode has a smaller mass than the positive electrode. However, the negative electrode needs to have a current withstanding capability against a current 1.2 times or more as high as a current value at which the lamp lights stably in order to withstand continuous application of the current for the predetermined time period described above. In this way, the ultra-high pressure discharge lamp for lighting with direct current also can be made flickerless and to have a longer life.

As described above, an electrode surface become roughened or formed with projections by the thermal factor and the oxygen factor. Since the positive electrode is heated due to constant impingement of thermal electrons thereupon in usual lighting, such roughening or projections on the positive electrode caused by the two factors can be eliminated by heat resulting from continuous application of the current and, hence, the surface of the positive electrode is restored.

The negative electrode, however, continuously emits thermal electrons and, hence, surface restoration, which occurs on the positive electrode, does not occur on the negative electrode. Accordingly, the negative electrode is gradually roughened or formed with growing projections. To avoid the occurrence of this inconvenience, the aforementioned feature that a control is performed such that a time period of at least one second for which the direct current is applied in a direction opposite to a direction of the current applied in usual lighting is intermittently provided during a period for which the lamp lights, allows thermal electrons to impinge upon the negative electrode for a predetermined time period thereby causing the surface of the negative electrode to be restored. At least one second is required as this electrode surface restoring time period. If it is shorter than one second, insufficient restoration will result.

In the case of lighting with alternating current, the term "current withstanding capability" means a capability such that each electrode is not deformed at an end portion thereof during a time period of 10 seconds for which the electrode is applied with a current 1.5 times as high as a current value at which the lamp lights stably. In the case of lighting with direct current, on the other hand, the term "current withstanding capability" means a capability such that each electrode is not deformed at an end portion thereof during a time period of 10 seconds for which the electrode is applied with a current 1.2 times as high as a current value at which the lamp lights stably.

According to the present invention, there is also provided a method of lighting an ultra-high pressure discharge lamp having a discharge bulb made of quartz glass in which a pair of electrodes are disposed facing each other, the method comprising:

lighting the lamp with alternating current; and
providing a time period of at least one second for which the alternating current assumes a value is equal to or higher than a rated current value during a period for which the lamp lights steadily, wherein
the electrodes have a current withstanding capability against a current 1.5 times or more as high as a current value at which the lamp lights stably.

According to the present invention, there is also provided a method of lighting an ultra-high pressure discharge lamp having a discharge bulb made of quartz glass in which a pair of electrodes are disposed facing each other, the method comprising:

lighting the lamp with direct current; and
performing a control such that a time period of at least one second for which the direct current is applied in a direction opposite to a direction of the current applied in usual lighting is intermittently provided during a period for which the lamp lights, while a time period of at least one second for which the alternating current assumes a value equal to or higher than a rated current value when the lamp lights steadily, wherein
a negative electrode of the pair of electrodes has a current withstanding capability against a current 1.2 times or more as high as a current value at which the lamp lights stably.

In these methods, an excessive current, which is equal to or higher than a rated current, is applied for at least one second during a period for which the lamp lights steadily, whereby an electrode surface can be rapidly restored.

According to the present invention, there is also provided an ultra-high pressure discharge lamp configured to be lighted with alternating current, comprising a discharge bulb made of quartz glass and imposed with a bulb load of 0.7 w/cm² or more, and a pair of electrodes disposed facing each other in the discharge bulb, the discharge bulb encapsulating therein at least one halogen selected from the group consisting of I, Br, and Cl in an amount ranging between $1\times10^{-4}$ $\mu$mol/mm³ and $1\times10^{-2}$ $\mu$mol/mm³, mercury in an amount of 0.15 mg/mm³ or more, and a rare gas as an initiator gas, wherein the electrodes each have a current withstanding capability against a current 1.5 times or more as high as a current value at which the lamp lights stably.

According to the present invention, there is also provided a ballast for use in an ultra-high pressure discharge lamp configured to be lighted with alternating current as recited above, the ballast being capable of providing a time period of at least one second for which the alternating current assumes a lighting frequency of 5 Hz or lower during a period for which the lamp lights.

In an embodiment of the ballast stated above, the time period of at least one second for which the alternating current assumes a lighting frequency of 5 Hz or lower is provided during a time period of three minutes from a time point at which lighting of the lamp is initiated to a time point at which lighting of the lamp becomes completely stabilized.

In another embodiment of the ballast, the time period of at least one second for which the alternating current assumes a lighting frequency of 5 Hz or lower is provided at a time point at which a lamp voltage lowers to a predetermined value during a period for which the lamp lights stably.

Yet another embodiment of the ballast is capable of providing a time period of at least one second for which the alternating current assumes a value equal to or higher than a rated current value during a period for which the lamp lights.

According to the present invention, there is also provided an ultra-high pressure discharge lamp configured to be lighted with direct current, comprising a discharge bulb made of quartz glass and imposed with a bulb load of 0.7 w/cm² or more, and a pair of electrodes disposed facing each other in the discharge bulb, the discharge bulb encapsulating therein at least one halogen selected from the group consisting of I, Br, and Cl in an amount ranging between $1\times10^{-4}$ $\mu$mol/mm³ and $1\times10^{-2}$ $\mu$mol/mm³, mercury in an amount of 0.15 mg/mm³ or more, and a rare gas as an initiator gas, wherein a negative electrode of the electrodes has a current withstanding capability against a current 1.2 times or more as high as a current value at which the lamp lights stably.

According to the present invention, there is also provided a ballast for use in an ultra-high pressure discharge lamp configured to be lighted with direct current as recited above, the ballast being capable of performing a control such that a time period of at least one second for which the direct current is applied in a direction opposite to a direction of the current applied in usual lighting is intermittently provided during a period for which the lamp lights.

In an embodiment of the ballast stated above, the time period of at least one second for which the current is applied in a direction opposite to a direction of the current applied in usual lighting is provided during a time period of three minutes from a time point at which lighting of the lamp is initiated.

In another embodiment of the ballast, the time period of at least one second for which the current is applied in a direction opposite to a direction of the current applied in usual lighting is provided at a time point at which a lamp voltage lowers to a predetermined value during a period for which the lamp lights stably.

Yet another embodiment of the ballast is capable of providing a time period of at least one second for which the direct current assumes a value equal to or higher than a rated current value during a period for which the lamp lights.

According to the present invention, there is also provided a lighting system comprising an ultra-high pressure discharge lamp configured to be lighted with alternating current as recited above, and a ballast for use in such a lamp.

According to the present invention, there is also provided a lighting system comprising an ultra-high pressure discharge lamp configured to be lighted with direct current as recited above, and a ballast for use in such a lamp.

These and other objects, features and attendant advantages of the present invention will be fully appreciated from the following detailed description taken in conjunction with the attached drawings.

DETAILED DESCRIPTION OF THE PREFERRED EMBODIMENTS

The present invention will now be described in detail by way of embodiments thereof with reference to the drawings.

Figure 1:
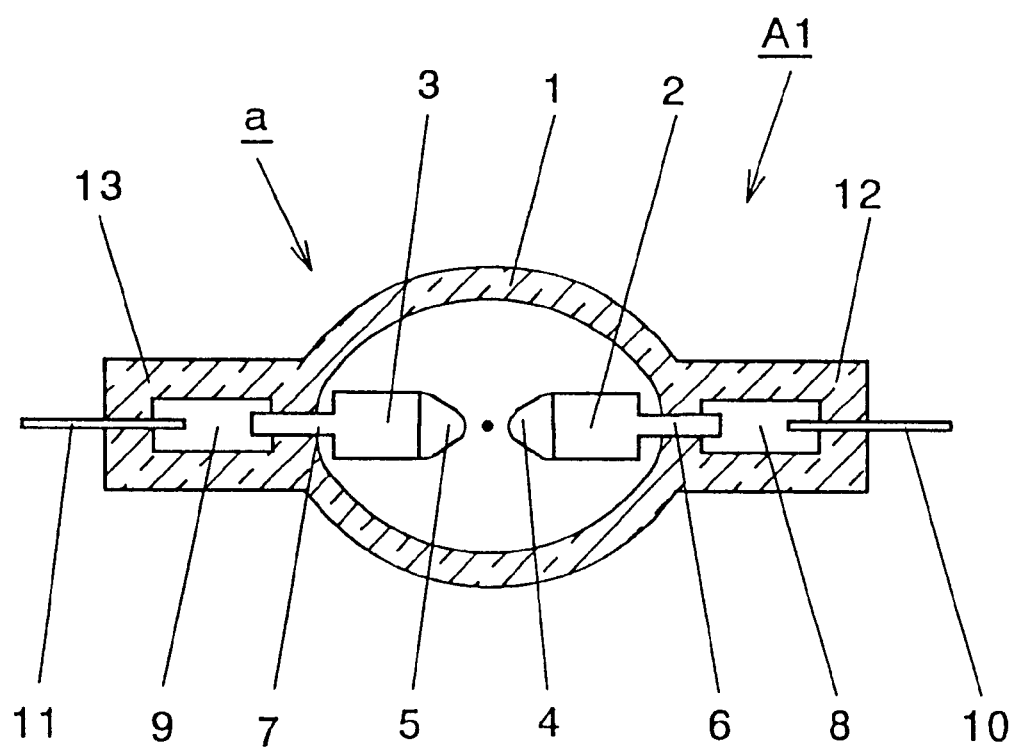
FIG. 1 is a sectional view showing an embodiment of the present invention.

Referring first to FIG. 1, there is shown an ultra-high pressure discharge lamp A1 configured to be lighted with alternating current according to the present invention. The lamp A1 has a basic configuration similar to a conventional one, comprising a discharge bulb 1 and electrodes 2 and 3 disposed facing each other in the discharge bulb 1. The electrodes 2 and 3 each may be either a one-piece member cut out of a circular tungsten bar or an integral one formed by fitting a sleeve or coil of tungsten over an end portion of a circular tungsten bar and fusing the end portion to secure the sleeve or coil to the tungsten bar. In either case, the electrodes 2 and 3 have respective semispherical head portions 4 and 5 each having a relatively large diameter, and respective thin leg portions 6 and 7 each outwardly extending from the corresponding head portion. The electrodes 2 and 3, more strictly speaking, the head portions 4 and 5 are each required to have a current withstanding capability against a current 1.5 times or more as high as a current value at which the lamp lights stably. In other words, each electrode needs to have a mass such that the electrode is not deformed at an end portion thereof during a time period of 10 seconds for which the electrode is applied with a current 1.5 times or more as high as a current value at which the lamp lights stably.

The leg portion 6 or 7 of each electrode 2 or 3 is welded to one end of each of molybdenum foils 8 and 9, and the other end of each molybdenum foil 8 or 9 is welded to an external lead 10 or 11. The molybdenum foil 8 together with a relevant part of the leg portion 6 and a relevant part of the external lead 10 is embedded in a sealing portion 12, while the molybdenum foil 9 together with a relevant part of the leg portion 7 and a relevant part of the external lead 11 is embedded in a sealing portion 13. The sealing portions 12 and 13 are located at opposite ends of a quartz envelope (a) comprising a spherical or oval discharge bulb 1 located centrally thereof. In the discharge bulb 1, the electrodes 2 and 3 are disposed facing each other. Since the direction of alternating current is changed periodically, the electrodes 2 and 3 adapted for lighting with alternating current are shaped identical with each other.

Figure 2:
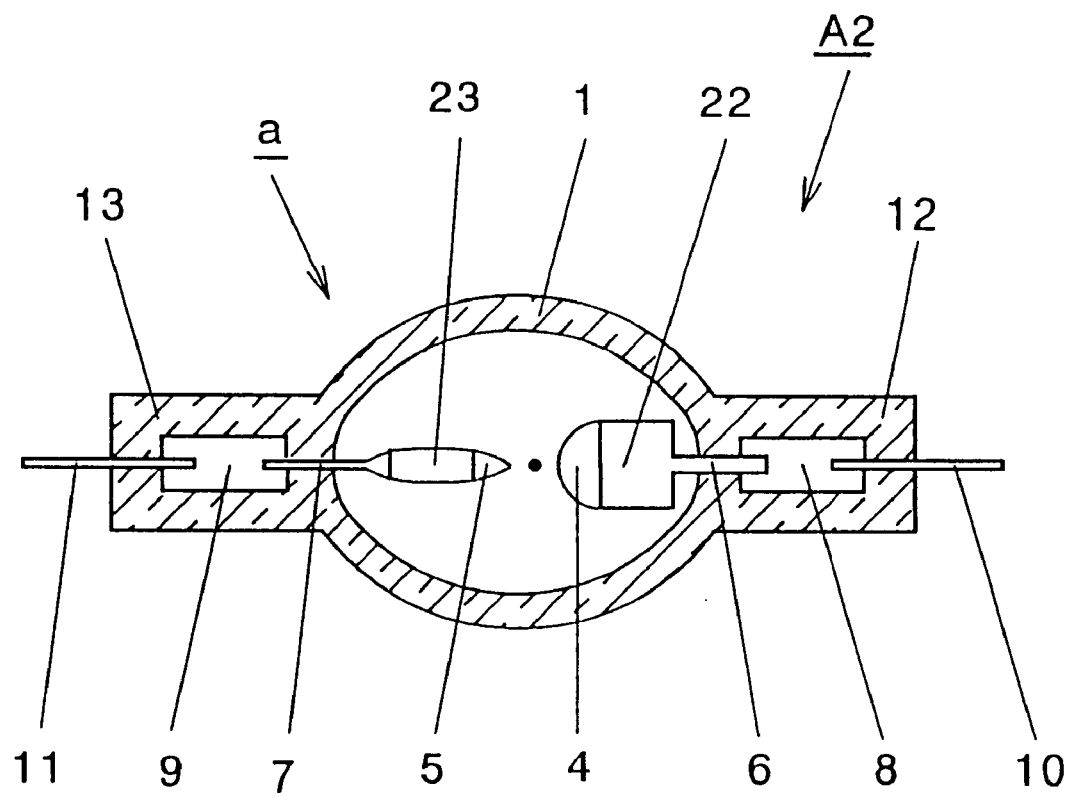
FIG. 2 is a sectional view showing another embodiment of the present invention.

Referring to FIG. 2, there is shown an ultra-high pressure discharge lamp A2 configured to be lighted with direct current, which is of substantially the same configuration as the lamp A1 configured to be lighted with alternating current except that a positive electrode 23 upon which thermal electrons constantly impinge is made larger than a negative electrode 22 constantly emitting thermal electrons because the direction of direct current does not change like alternating current. The positive electrode 22 needs to have a mass that is sufficient to withstand constant impingement of thermal electrons as does a positive electrode used in the conventional ultra-high pressure lamp adapted for direct current. The negative electrode 23, on the other hand, is required to have a current withstanding capability against a current 1.2 times or more as high as a current value at which the lamp lights stably for the reason stated above. In other words, the negative electrode 23 needs to have a mass such that the electrode 23 is not deformed at an end portion thereof during a time period of 10 seconds for which the electrode is applied with a current 1.2 times or more as high as a current value at which the lamp lights stably.

The discharge bulb 1 of each of the discharge lamps A1 and A2 encapsulates therein at least one halogen selected from the group consisting of I, Br, and Cl in an amount ranging between $1\times10^{-4}$ μmol/mm$^3$ and $1\times10^{-2}$ μmol/mm$^3$, mercury in an amount of 0.15 mg/mm$^3$ or more, and a rare gas as an initiator gas. It is established that the discharge bulb 1 is imposed with a bulb load of 0.7 w/cm$^2$ or more during lighting.

A method of lighting the lamp configured to be lighted with alternating current is as follows. According to this method, a control is performed so that a time period of at least one second for which the alternating current assumes a lighting frequency of 5 Hz or lower is provided during a period for which the lamp lights by means of a ballast for controlling a current application state of the ultra-high pressure discharge lamp. Usually, the lamp for lighting with alternating current is lighted with the current assuming a lighting frequency of 50 Hz or higher. If, however, an electrode surface restoring period of one second for which the current assumes a lighting frequency of 5 Hz or lower is provided, the direction of the current is switched with cycles of 0.2 seconds, which is much longer than in the case of the usual lighting frequency. If the lighting frequency in the electrode surface restoring period is higher than 5 Hz, the continuous current application period is too short to allow the electrode surface to be restored sufficiently because the direction of current is switched before roughening or projections on the electrode surface have been completely eliminated. For this reason, the lighting frequency in the electrode surface restoring period is adequately 5 Hz or lower. However, since the lower lighting frequency is more preferable, it is possible to provide a longer electrode surface restoring period such as 20 seconds at 0.05 Hz, or 1000 seconds at 0.01 Hz.

Though the electrode surface restoring period may be provided at any time during the lighting period, the electrode surface restoring period is preferably provided during a time period of three minutes from a time point at which lighting of the lamp is initiated to a time point at which lighting of the lamp becomes completely stabilized because an electrode surface is likely to damage due to a particularly large current flowing in this period.

Since an electrode surface becomes gradually roughened or formed with projections even during a stable lighting period, it is preferred that the electrode surface restoring period be intermittently provided with predetermined time intervals during the stable lighting period.

An electrode surface may otherwise be restored during the stable lighting period by providing a time period of at least one second for which the current assumes a value equal to or higher than a rated current value during a period for which the lamp lights steadily. If such an electrode surface restoring period is too long, each electrode may be consumed. For this reason, the electrode surface restoring period in this case is usually established to be about 10 seconds plus or minus 5 seconds, and has an upper limit of 1,000 seconds. The current applied in the electrode surface restoring period is preferably not higher than a value 1.5 times as high as a rated current in view of possible damage to each electrode. If, however, the electrode surface restoring period is 10 seconds or longer, the current has to be lower than a value 1.5 times as high as a rated current value.

A method of lighting the lamp configured to be lighted with direct current is as follows. According to this method, a control is performed so that a time period of at least one second for which the current is applied in a direction opposite to a direction of the current applied in usual lighting is intermittently provided during a period for which the lamp lights by means of a ballast for controlling a current application state of the ultra-high pressure discharge lamp. It should be noted that the "direction of the current applied in usual lighting" is meant by the direction in which thermal electrons flows as an arc from the negative electrode to the positive electrode and, hence, the direction opposite to that direction is the direction in which thermal electrons flows from the positive electrode to the negative electrode. If this electrode surface restoring period is shorter than one second, restoration of the electrode surface is insufficient. Such an electrode surface restoring period is at least one second, at maximum about 1,000 seconds, usually about 10 seconds plus or minus 5 seconds.

Though the electrode surface restoring period may be provided at any time during the lighting period, the electrode surface restoring period is preferably provided during a time period of three minutes from a time point at which lighting of the lamp is initiated to a time point at which lighting of the lamp becomes completely stabilized because an electrode surface is likely to damage due to a particularly large current flowing in this period.

Since an electrode surface becomes gradually roughened or formed with projections even during a stable lighting period, it is preferred that the electrode surface restoring period be intermittently provided with predetermined time intervals during the stable lighting period.

The mechanism of restoring an electrode surface is as follows. When an electrode surface in a roughened state due to lighting with the current assuming a frequency of 50 Hz is applied with the current assuming a lighting frequency of 5 Hz or lower for at least one second, the electrode surface is uniformly heated to fuse deposited tungsten, with the result that plural projections formed thereon are eliminated and the electrode surface is restored. Arc is generated between tip portions of the electrodes after lapse of 30 seconds from the time at which lighting of the ultra-high pressure discharge lamp is initiated. From this time point, restoration of the tip portion of each electrode becomes possible. The time taken for the electrode surface to be restored by application of the current assuming a lighting frequency of 5 Hz was measured. As a result, it took about 2 minutes 30 seconds. At a lighting frequency of 1 Hz, it took about 15 seconds for the electrode surface to be restored. At a lighting frequency of 6 Hz, satisfactory restoration was not achieved even after lapse of 10 minutes.

When the lamp lights stably, arc is already generated between the tip portions of respective electrodes and, hence, the temperature of each electrode is raised sufficiently. In this state, an electrode surface can be restored by providing a restoring period of one second for which the current assumes a lighting frequency of 1 Hz.

With electrodes having an enhanced current withstanding capability (i.e., an increased mass) such as to lessen consumption thereof due to the thermal factor, the oxygen factor is predominant over the thermal factor in deposition and accumulation of tungsten, and the spacing between such electrodes is liable to shorten. When an ultra-high pressure discharge lamp for lighting with alternating current employing such electrodes was combined with a ballast according to the present invention, projections of tungsten causing flicker could be eliminated, while the arc length could be maintained constant for a long time. In this case, a variation in arc length was as small as ±10% or less in 5,000 hours, a variation in screen illuminance due to the variation in arc length was substantially zero, and a screen illuminance keeping rate was 85%, which is very high.

Like the electrodes of the ultra-high pressure discharge lamp for lighting with alternating current, the electrodes of an ultra-high pressure discharge lamp for lighting with direct current become roughened. In the case of the lamp for lighting with direct current, roughening or projections on the negative electrode, in particular, are responsible for flicker. When an electrode surface of the negative electrode adjacent the arc generating location is roughened, the thermal electron emitting point is likely to move around, which leads to flicker.

According to the present invention, discharge is temporarily caused to occur in a direction toward the negative electrode thus roughened, which is opposite to the direction of discharge in usual lighting. Stated otherwise, the negative electrode is temporarily used as a positive electrode. By doing so, the tip portion of the negative electrode is heated to fuse projections resulting from deposition of tungsten thereon, with the result that the electrode surface restores a smooth spherical surface.

As in the lamp adapted for alternating current described above, arc is generated between tip portions of the electrodes after lapse of about 30 seconds from initiation of lighting of the ultra-high pressure discharge lamp adapted for direct current. From this time point, restoration of the tip portion of each electrode becomes possible. The time taken for an electrode surface to be restored by switching the direction of the current was measured. As a result, it took about 15 seconds. Like the former case, when the lamp lights stably, arc is already generated between the tip portions of respective electrodes and, hence, the temperature of each electrode is raised sufficiently. In this state, the electrode surface can be restored by providing a restoring period of about one second for which the direction of the current is opposite to that in usual lighting.

With a negative electrode having a current withstanding capability such as to lessen consumption thereof due to the thermal factor, the oxygen factor is predominant over the thermal factor in deposition and accumulation of tungsten, and the spacing between the electrodes is liable to shorten as in the lamp for lighting with alternating current. When an ultra-high pressure discharge lamp lighting with direct current employing such an electrode was combined with a ballast according to the present invention, projections of tungsten causing flicker could be eliminated, while the arc length could be maintained constant for a long time. In this case, a variation in arc length was as small as ±12% or less in 5,000 hours, which is somewhat inferior to the case of the lamp adapted for alternating current, a variation in screen illuminance due to the variation in arc length was substantially zero, and a screen illuminance keeping rate was 82%, which is very high.

Description will be directed to comparison between the present invention and the prior art with reference to Tables. The following Table 1 shows the results of an experiment conducted to compare a conventional electrode and an improved electrode having an increased mass as to variation in arc length and roughening of an electrode surface with lighting time. This experiment was conducted under the conditions: bulb load=0.85 w/mm$^2$, amount of mercury encapsulated=0.18 mg/mm$^3$, amount of a halogen (Br) encapsulated=2.5×10$^{-4}$ μmol/mm$^3$, lighting power=200 W.

TABLE 1

| | Conventional Electrode | | | Current Withstanding Capability Improved Electrode | | |
|---|---|---|---|---|---|---|
| Lighting time | Arc Length | Roughening or Projections | Flicker | Arc Length | Roughening or Projections | Flicker |
| 0 | 1.35 | nil | nil | 1.33 | nil | nil |
| 100 | 1.52 | 2 | 5% | 1.28 | 1 | nil |
| 200 | 1.61 | 1 | nil | 1.22 | 1 | nil |
| 300 | 1.63 | 2 | nil | 1.30 | 2 | nil |
| 400 | 1.58 | 2 | 15% | 1.20 | 1 | nil |
| 500 | 1.60 | 2 | 10% | 1.18 | 2 | 7% |
| 600 | 1.65 | 2 | 6% | 1.35 | 2 | 5% |
| 700 | 1.72 | 2 | 8% | 1.41 | 2 | 10% |
| 800 | 1.89 | 2 large* | 18% | 1.27 | 2 | 5% |
| 900 | 1.79 | 2 large* | 24% | 1.23 | 2 | 13% |
| 1000 | 1.82 | 3 | 24% | 1.38 | 2 | 15% |

Remark: each of the numbers in the column "Roughening or Projections" is indicative of the number of projections formed; "2 large" with asterisk means that two large projections were formed; and "nil" in the column "Flicker" represents a case where a variation of 3% or lower in illuminance occurred.

As seen from Table 1, the conventional electrode was consumed rapidly with the arc length rapidly lengthened as compared with the improved electrode. Both of the electrodes become roughened after lapse of 100 hours from the starting of the experiment. The improved electrode caused flicker to occur constantly after lapse of 500 hours from the starting of the experiment, whereas the conventional electrode caused flicker to occur constantly after lapse of 400 hours from the starting of the experiment. Thus, the improved electrode was slightly improved in deferring roughening of the electrode surface.

Table 2 shows the results of experiments conducted to compare the characteristics of an ultra-high pressure discharge lamp for lighting with alternating current comprising a combination of a conventional electrode and a ballast according to the present invention with those of an ultra-high pressure discharge lamp for lighting with alternating current comprising a combination of an improved electrode and the ballast according to the present invention. The experiments were conducted under the conditions: bulb load=0.85 w/mm$^2$, amount of mercury encapsulated=0.18 mg/mm$^3$, amount of a halogen (Br) encapsulated=1.5×10$^{-4}$ μmol/mm$^3$, lighting power=200 W, and current having a frequency of 1 Hz was continuously applied for 30 seconds after lapse of 30 seconds from initiation of lighting of the lamp to restore each electrode.

TABLE 2

Results of life test using an intelligent ballast enabling restoration of electrodes

| Lighting Time | Arc Length | Number of Roughened Electrodes | Number of Occurrences of Flicker | Flicker Rate | Illuminance keeping rate |
|---|---|---|---|---|---|
| Conventional Electrode | | | | | |
| 0 | 1.31 | 0 | 0 | | 100 |
| 100 | 1.43 | 0 | 0 | | 96 |
| 500 | 1.45 | 0 | 0 | | 91 |
| 1000 | 1.55 | 0 | 0 | | 93 |
| 1500 | 1.58 | 0 | 0 | | 88 |
| 2000 | 1.66 | 1 | 0 | | 83 |
| 2500 | 1.71 | 2 | 0 | | 72 |
| 3000 | 1.82 | 2 | 1 | 6.3% | 64 |
| 3500 | 1.89 | 2 | 1 | 7.5% | 63 |
| 4000 | 1.88 | 3 | 3 | 7.2% | 66 |
| 4500 | 2.02 | 3 | 2 | 8.6% | 49 |
| 5000 | 2.1 | 3 | 2 | 12.4% | 48 |
| Current Withstanding Capability Improved Electrode | | | | | |
| 0 | 1.30 | 0 | 0 | | 100 |
| 100 | 1.25 | 0 | 0 | | 105 |
| 500 | 1.20 | 0 | 0 | | 103 |
| 1000 | 1.22 | 0 | 0 | | 101 |
| 1500 | 1.28 | 0 | 0 | | 100 |
| 2000 | 1.31 | 0 | 0 | | 98 |
| 2500 | 1.35 | 0 | 0 | | 95 |
| 3000 | 1.32 | 0 | 0 | | 94 |
| 3500 | 1.29 | 0 | 0 | | 95 |
| 4000 | 1.38 | 0 | 0 | | 91 |
| 4500 | 1.38 | 0 | 0 | | 88 |
| 5000 | 1.42 | 0 | 0 | | 85 |

Remarks: evaluation was made by repeating two hours' light-on and 15 minutes' light-off; each of the experiments consisted of five runs; the arc length is an average value of the results of five runs; the number of roughened electrodes in Table 2 is the number of electrodes formed with two or more projections; the number of occurrences of flicker in Table 2 is the number of runs in each of which flicker, i.e., a variation of 3% or more in illuminance, occurred; the flicker rate is an average value of flickers that occurred; and the illuminance keeping rate is an average value of the results of five runs.

As seen from Table 2, in the case of the lamp comprising the conventional electrode and the ballast according to the present invention, roughening of the electrode surface occurred 2,000 hours after the commencement of the experiment and flicker occurred 3,000 hours after the commencement of the experiment. As can be understood from comparison between this result and the result shown in Table 1 that roughening of the electrode surface occurred about 100 hours after the commencement of the experiment, the ballast according to the present invention was highly effective. In the case of the lamp comprising the improved electrode and the ballast according to the present invention, flicker did not occur even after lapse of 5,000 hours from the commencement of the experiment and an increase in arc length was remarkably deferred. As can be understood therefrom, the combination of the improved electrode and the ballast according to the present invention provided a surprising improvement.

Table 3 shows the results of experiments conducted to compare the characteristics of an ultra-high pressure discharge lamp for lighting with direct current comprising a combination of a conventional electrode and a ballast according to the present invention with those of an ultra-high pressure discharge lamp for lighting with direct current comprising a combination of an improved electrode and the ballast according to the present invention. The experiments were conducted under the conditions: bulb load=0.85 w/mm$^2$, amount of mercury encapsulated=0.18 mg/mm$^3$, amount of a halogen (Br) encapsulated=1.5×10$^{-4}$ μmol/mm$^3$, lighting power=270 W, and current in a direction such as to restore the negative electrode was continuously applied for 20 seconds.

TABLE 3

Results of life test using an intelligent ballast enabling restoration of electrodes

| Lighting Time | Arc Length | Number of Roughened Electrodes | Number of Occurrences of Flicker | Flicker Rate | Illuminance keeping rate |
|---|---|---|---|---|---|
| Conventional Electrode | | | | | |
| 0 | 1.45 | 0 | 0 | | 100 |
| 100 | 1.40 | 0 | 0 | | 96 |
| 500 | 1.41 | 0 | 0 | | 91 |
| 1000 | 1.59 | 0 | 0 | | 93 |
| 1500 | 1.63 | 0 | 0 | | 88 |
| 2000 | 1.65 | 0 | 0 | | 83 |
| 2500 | 1.62 | 0 | 0 | | 72 |
| 3000 | 1.79 | 2 | 0 | | 64 |
| 3500 | 1.85 | 2 | 0 | | 63 |
| 4000 | 1.80 | 2 | 1 | 8% | 66 |
| 4500 | 1.91 | 3 | 1 | 7% | 49 |
| 5000 | 1.95 | 3 | 1 | 5% | 48 |
| Current Withstanding Capability Improved Electrode | | | | | |
| 0 | 1.38 | 0 | 0 | | 100 |
| 100 | 1.37 | 0 | 0 | | 95 |
| 500 | 1.34 | 0 | 0 | | 95 |
| 1000 | 1.42 | 0 | 0 | | 91 |
| 1500 | 1.45 | 0 | 0 | | 89 |
| 2000 | 1.43 | 0 | 0 | | 90 |
| 2500 | 1.48 | 0 | 0 | | 88 |
| 3000 | 1.46 | 0 | 0 | | 85 |
| 3500 | 1.50 | 0 | 0 | | 87 |
| 4000 | 1.52 | 0 | 0 | | 80 |
| 4500 | 1.55 | 0 | 0 | | 83 |
| 5000 | 1.55 | 0 | 0 | | 82 |

Remarks: evaluation was made by repeating two hours' light-on and 15 minutes' light-off; each of the experiments consisted of five runs; the arc length is an average value of the results of five runs; the number of roughened electrodes in Table 3 is the number of electrodes formed with two or more projections; the number of occurrences of flicker in Table 3 is the number of runs in each of which flicker, i.e., a variation of 3% or more in illuminance, occurred; the flicker rate is an average value of flickers that occurred; and the illuminance keeping rate is an average value of the results of five runs.

As seen from Table 3, in the case of the lamp comprising the conventional electrode and the ballast according to the present invention, roughening of the electrode surface occurred 3,000 hours after the commencement of the experiment and flicker occurred 4,000 hours after the commencement of the experiment. As can be understood from comparison between this result and the result shown in Table 1 that roughening of the electrode surface occurred about 100 hours after the commencement of the experiment, the ballast according to the present invention was highly effective. In the case of the lamp comprising the improved electrode and the ballast according to the present invention, flicker did not occur even after lapse of 5,000 hours from the commencement of the experiment and an increase in arc length was remarkably deferred. As can be understood therefrom, the combination of the improved electrode and the ballast according to the present invention provided a surprising improvement.

According to the present invention, an electrode having an improved current withstanding capability is combined with a ballast enabling continuous application of current for a time period required to restore the electrode surface. This combination makes it possible to eliminate roughening or projections formed on the electrode surface during lighting which cause the arc length to increase thereby causing a decrease in illuminance and flicker to occur. Thus, the present invention has overcome the problems of this type of discharge lamps that have been considered unsolvable.

While certain presently preferred embodiments of the present invention have been described in detail, as will be apparent for those skilled in the art, certain changes and modifications may be made in embodiment without departing from the spirit and scope of the present invention as defined by the following claims.

What is claimed is:

1. A method of lighting an ultra-high pressure discharge lamp having a discharge bulb made of quartz glass in which a pair of electrodes are disposed facing each other, the method comprising:
   lighting the lamp with alternating current; and
   providing a time period of at least one second for which the alternating current assumes a lighting frequency of 5 Hz or lower during a period for which the lamp lights, wherein
      the electrodes each have a current withstanding capability against a current at least 1.5 times greater than a current value at which the lamp light is stabilized.

2. A method of lighting an ultra-high pressure discharge lamp having a discharge bulb made of quartz glass in which a pair of electrodes are disposed facing each other, the method comprising:
   lighting the lamp with alternating current; and
   providing a time period of at least one second for which the alternating current assumes a value equal to or higher than a rated current value during a period for which the lamp lights steadily, wherein
      the electrodes each have a current withstanding capability against a current at least 1.5 times greater than a current value at which the lamp light is stabilized, and
      wherein during the time period a surface of at least one of the electrodes reaches a temperature sufficient to cause projections on the surface to fuse and extend over the surface.

3. A method of lighting an ultra-high pressure discharge lamp having a discharge bulb made of quartz glass in which a pair of electrodes are disposed facing each other, the method comprising:
   lighting the lamp with direct current; and
   performing a control such that a time period of at least one second for which the direct current is applied in a direction opposite to a direction of the current applied in usual lighting is intermittently provided during a period for which the lamp lights, wherein
      a negative electrode of the pair of electrodes has a current withstanding capability against a current at least 1.2 times greater than a current value at which the lamp light is stabilized.

4. A method of lighting an ultra-high pressure discharge lamp having a discharge bulb made of quartz glass in which a pair of electrodes are disposed facing each other, the method comprising:
   lighting the lamp with direct current; and
   performing a control such that a time period of at least one second for which the direct current is applied in a direction opposite to a direction of the current applied in usual lighting is intermittently provided during a period for which the lamp lights, while a time period of at least one second for which the the alternating current assumes a value equal to or higher than a rated current value during a period for which the lamp lights steadily, wherein
      a negative electrode of the pair of electrodes has a current withstanding capability against a current at least 1.2 times greater than a current value at which the lamp light is stabilized.

5. An ultra-high pressure discharge lamp configured to be lit with an alternating current, comprising:
   a discharge bulb made of quartz glass and imposed with a bulb load of 0.7 w/cm$^2$ or more; and
   a pair of electrodes disposed facing each other in the discharge bulb, wherein
      the discharge bulb encapsulates at least one halogen selected from the group consisting of I, Br, and Cl in an amount ranging between $1\times10^{-4}$ μmol/mm$^3$ and $1\times10^{-2}$ μmol/mm$^3$, mercury in an amount of 0.15 mg/mm$^3$ or more, and a rare gas as an initiator gas, and
      the electrodes each have a current withstanding capability against a current at least 1.5 times greater than a current value at which the lamp light is stabilized.

6. A ballast for use in an ultra-high pressure discharge lamp configured to be lit with alternating current, said ultra-high pressure discharge lamp including,
   a discharge bulb made of quartz glass and imposed with a bulb load of 0.7 w/cm$^2$ or more, and
   a pair of electrodes disposed facing each other in the discharge bulb, wherein
      the discharge bulb encapsulates at least one halogen selected from the group consisting of I, Br, and Cl in an amount ranging between $1\times10^{-4}$ μmol/mm$^3$ and $1\times10^{-2}$ μmol/mm$^3$, mercury in an amount of 0.15 mg/mm$^3$ or more, and a rare gas as an initiator gas,
      the electrodes each have a current withstanding capability against a current at least 1.5 times greater than a current value at which the lamp light is stabilized, and
      the ballast provides a time period of at least one second for which the alternating current assumes a lighting frequency of 5 Hz or lower during a period for which the lamp light is stabilized.

7. The ballast according to claim 6, wherein the time period of at least one second for which the alternating current assumes a lighting frequency of 5 Hz or lower is provided during a time period of three minutes from a time point at which lighting of the lamp is initiated to a time point at which the lamp light is stabilized.

8. The ballast according to claim 6, wherein the time period of at least one second for which the alternating current assumes a lighting frequency of 5 Hz or lower is provided at a time point at which a lamp voltage lowers to a predetermined value during a period for which the lamp light is stabilized.

9. The ballast according to claim 6, wherein the ballast provides a time period of at least one second for which the alternating current assumes a value equal to or higher than a rated current value during a period for which the lamp is lit.

10. An ultra-high pressure discharge lamp configured to be lit with direct current, comprising:
   a discharge bulb made of quartz glass and imposed with a bulb load of 0.7 w/cm$^2$ or more; and a pair of electrodes disposed facing each other in the discharge bulb, wherein the discharge bulb encapsulates at least one halogen selected from the group consisting of I, Br, and Cl in an amount ranging between $1\times10^{-4}$ µmol/mm$^3$ and $1\times10^{-2}$ µmol/mm$^3$, mercury in an amount of 0.15 mg/mm$^3$ or more, and a rare gas as an initiator gas, and a negative electrode of the electrodes has a current withstanding capability against a current at least 1.2 times greater than a current value at which the lamp is lit.

11. A ballast for use in an ultra-high pressure discharge lamp configured to be lit with direct current, said ultra-high pressure discharge lamp including, a discharge bulb made of quartz glass and imposed with a bulb load of 0.7 w/cm$^2$ or more, and a pair of electrodes disposed facing each other in the discharge bulb, wherein the discharge bulb encapsulates at least one halogen selected from the group consisting of I, Br, and Cl in an amount ranging between $1\times10^{-4}$ µmol/mm$^3$ and $1\times10^{-2}$ µmol/mm$^3$, mercury in an amount of 0.15 mg/mm$^3$ or more, and a rare gas as an initiator gas, a negative electrode of the electrodes has a current withstanding capability against a current at least 1.2 times greater than a current value at which the lamp is lit, and the ballast performs a control such that a time period of at least one second for which the direct current is applied in a direction opposite to a direction of the current applied in usual lighting is intermittently provided during a period for which the lamp is lit.

12. The ballast according to claim 11, wherein the time period of at least one second for which the direct current is applied in a direction opposite to a direction of the current applied in usual lighting is provided during a time period of three minutes from a time point at which lighting of the lamp is initiated.

13. The ballast according to claim 11, wherein the time period of at least one second for which the direct current is applied in a direction opposite to a direction of the current applied in usual lighting is provided at a time point at which a lamp voltage lowers to a predetermined value during a period for which the lamp light is stabilized.

14. The ballast according to claim 11, wherein the ballast provides a time period of at least one second for which the direct current assumes a value equal to or higher than a rated current value during a period for which the lamp is lit.

15. A lighting system comprising:

an ultra-high pressure discharge lamp configured to be lit with alternating current, said ultra-high pressure discharge lamp including a discharge bulb made of quartz glass and imposed with a bulb load of 0.7 w/cm$^2$ or more, and a pair of electrodes disposed facing each other in the discharge bulb; and a ballast that provides a time period of at least one second for which the alternating current assumes a lighting frequency of 5 Hz or lower during a period for which the lamp light is stabilized, wherein the discharge bulb encapsulates at least one halogen selected from the group consisting of I, Br, and Cl in an amount ranging between $1\times10^{-4}$ µmol/mm$^3$ and $1\times10^{-2}$ µmol/mm$^3$, mercury in an amount of 0.15 mg/mm$^3$ or more, and a rare gas as an initiator gas, and the electrodes each have a current withstanding capability against a current at least 1.5 times greater than a current value at which the lamp light is stabilized.

16. A lighting system comprising:

an ultra-high pressure discharge lamp configured to be lit with direct current, said ultra-high pressure discharge lamp including a discharge bulb made of quartz glass and imposed with a bulb load of 0.7 w/cm$^2$ or more, and a pair of electrodes disposed facing each other in the discharge bulb; and a ballast that performs a control such that a time period of at least one section for which the direct current is applied in a direction opposite to a direction of the current applied in usual lighting is intermittently provided during a period for which the lamp is lit, wherein the discharge bulb encapsulates at least one halogen selected from the group consisting of I, Br, and Cl in an amount ranging between $1\times10^{-4}$ µmol/mm$^3$ and $1\times10^{-2}$ µmol/mm$^3$, mercury in an amount of 0.15 mg/mm$^3$ or more, and a rare gas as an initiator gas, and a negative electrode of the electrodes has a current withstanding capability against a current at least 1.2 times greater than a current value at which the lamp is lit.

* * * * *